UNITED STATES PATENT OFFICE.

BAPTIST REUTER, OF HÖCHST-ON-THE-MAIN, GERMANY, ASSIGNOR TO THE FARBWERKE, VORM. MEISTER, LUCIUS & BRÜNING, OF SAME PLACE.

NEUTRAL CAMPHORATE OF PHENYLDIMETHYLPYRAZOLON AND PROCESS OF MAKING SAME.

SPECIFICATION forming part of Letters Patent No. 674,687, dated May 21, 1901.

Application filed November 24, 1900. Serial No. 37,560. (Specimens.)

*To all whom it may concern:*

Be it known that I, BAPTIST REUTER, Ph. D., a citizen of the Empire of Germany, residing in Höchst-on-the-Main, Germany, have invented certain new and useful Improvements in the Manufacture of a Neutral Camphorate of Phenyldimethylpyrazolon, of which the following is a specification.

I have found that by the action of one molecular proportion of camphoric acid on two molecular proportions of phenyldimethylpyrazolon a neutral camphorate of this base may be obtained, which possesses valuable therapeutic properties.

The neutral camphorate of phenyldimethylpyrazolon is intended for internal medicinal use in the form of powders, lozenges, or solutions and in doses of from 0.3 to 0.75 of a gram for adults. It possesses antipyretic and antihydrotic properties, just as its components. The antihydrotic action of the new compound, however, is much stronger than was to be expected from its contents of camphoric acid, while the toxic action of phenyldimethylpyrazolon is greatly reduced.

To manufacture the neutral camphorate of phenyldimethylpyrazolon, I proceed as follows:

Example I: Three hundred and seventy-six kilos (two molecular proportions) of phenyldimethylpyrazolon, finely pulverized and well dried, are mixed in a ball-mill with two hundred kilos (one molecular proportion) of finely-pulverized dried camphoric acid, and this mixture is heated at about 100° centigrade. When cold, the mass solidifies in crystals. It is then pulverized and mixed with a little ligroin, from which it is separated by filtration, and then dried at 40° centigrade *in vacuo*.

The neutral camphorate of phenyldimethylpyrazolon is a white crystalline powder having a melting-point of 98° to 100° centigrade, readily soluble in hot water, alcohol, and dilute acids and soluble with difficulty in ether, benzene, and ligroin.

Example II: Three hundred and seventy-six kilos of dry pulverized phenyldimethylpyrazolon and two hundred kilos of dried pulverized camphoric acid are dissolved by heating in five hundred and seventy-six kilos of benzene, filtered, and on the solution becoming cold four times the quantity of ligroin are added. The camphorate is then separated by filtration as rough crystals, washed with ligroin, and dried *in vacuo* at 40° centigrade, producing white crystals having a melting-point of 98° to 100° centigrade.

Having thus described my invention, what I claim is—

1. The herein-described process of making a compound of phenyldimethylpyrazolon with camphoric acid, which consists in causing two molecular proportions of phenyldimethylpyrazolon to act on one molecular proportion of camphoric acid, substantially as set forth.

2. As a new product the neutral camphorate of phenyldimethylpyrazolon, being white crystals of a melting-point of 98° to 100° centigrade, readily soluble in hot water, alcohol, and dilute acids, soluble with difficulty in ether, benzene and ligroin, and having antipyretic and antihydrotic properties.

In testimony that I claim the foregoing as my invention I have signed my name in presence of two subscribing witnesses.

BAPTIST REUTER.

Witnesses:
ALFRED BRISBOIS,
BERNHARD LEYDECKER.